May 14, 1968     H. M. MUNCHERYAN     3,383,491

LASER WELDING MACHINE

Filed May 5, 1964     4 Sheets-Sheet 1

INVENTOR.

May 14, 1968 H. M. MUNCHERYAN 3,383,491
LASER WELDING MACHINE
Filed May 5, 1964 4 Sheets-Sheet 3

INVENTOR.
Hrand M. Muncheryan 3,383,491
LASER WELDING MACHINE
Hrand M. Muncheryan, 1735 Morningside St.,
Orange, Calif. 92667
Filed May 5, 1964, Ser. No. 364,923
18 Claims. (Cl. 219—121)

ABSTRACT OF THE DISCLOSURE

A laser welding machine is described which comprises a work console, a microscope swivelly pivoted thereon, a housing containing an electric power supply supported on said console and provided with an air- or water-cooled laser generator head having at its terminal end means to slidably accommodate thereon a split-tip conical optical system adapted with means to move said system up and down during welding of a workpiece positioned on a heated platen supported on said console in the inferior relation of said optical system. A laser triggering means with a temperature-sensitive control means is connected in the circuit of said laser generator and to said means for moving said optical system up and down to trigger said laser generator by downward movement of said optical system and upon contact of said split tip with said workpiece.

---

This invention relates to welding machines, and more particularly to a laser welding machine in which the thermal energy for welding is derived from a source of high-intensity radiation in the wavelength range of 3,000 to 27,000 angstroms, commonly known as laser, an acronym for "light amplification by stimulated emission of radiation."

The existing conventional welders utilize a flame from a burning gas, such as acetylene or hydrogen, an electric arc from a direct-current source, resistance welding by passing current through the workpiece placed between the ends of two electrodes, or ultrasonic welding in which a beam of high-frequency sound waves above the audible range is passed through the workpiece placed between two electrodes, vibrating the adjoining surfaces to be welded against each other at a rate above the sonic frequencies of 20,000 cycles per second. These methods invariably use electrodes in physical contact with the workpiece and thus heat a surrounding area several times larger than the weld area, causing grain growth in the material, stress concentration at times, and weakening of the parent material at the heat-affected areas. This condition necessitates additional heat treatment of the workpiece (if heat treatable) to recrystallize and reduce the grain size to normal dimension and to relieve stress in the material. Thus, the heat treatment prevents the material from cracking and degradation at regions contiguous to welded area. Obviously, this additional processing subsequent to welding is costly and time-consuming, and for some materials, such as for etched electronic circuit boards of epoxy-glass substrate, the heat treatment will destroy the circuit board.

In contrast with these conventional welding methods, laser welding has the following unique advantages: (1) The laser beam can be focused by means of an optical lens to an area of as small as 1 mil in diameter, or as large as 100 mils in diameter, so that microminiaturized electronic and mechanical parts can be welded regardless of their physical densities, because power densities of the order of $10^{14}$ watts per square centimeter can be attained and metallic sheet materials from a few mils up to ¼ inch in thickness may be welded. (2) The diameter of the beam focus may be increased to any desired size up to the diameter of the original collimated beam, which is approximately ¼ to ½ inch in diameter, by decreasing (or increasing) the distance between the lens and the material surface upon which the laser beam is to be focused. (3) Because of the high radiant intensity of the laser beam, it is possible to drill small holes down to 1 mil in diameter in sheets of metals, glass, and ceramics up to ⅛ inch in thickness. (4) Micromachining of thin films and microminiature electronic or mechanical components is possible by vaporizing the material in accordance with a desired pattern. (5) The welded area by a laser is strong and there is no grain growth in the metal surrounding the weld area and, therefore, no heat treatment of the workpiece is necessary. (6) The welding energy of laser can be varied by control settings of the machine or by means of a cascaded arrangement of lenses in series. (7) Seam welding with a series of superimposed laser bursts is also possible. (8) In the case of aircraft, rocket, or any other bulk structure, the spot welding or seam welding can be accomplished from the outside of the structure by focusing the laser beam on the structure. (9) Because the laser beam can be "piped" through a short-length fiber optics bundle without attenuation of its intensity, the welding energy can be carried to parts and areas inaccessible by means of conventional welding equipment.

In consideration of the above-stated advantages of laser in welding applications, I have innovated and designed a laser welding equipment with a principal object to provide a high-energy welder which can weld or drill holes through most any known materials with or without physical contact of the welder head with the workpiece.

Another object of my invention is the provision of an optical system of lens or lenses to control the density of the laser beam, without the use of electrical settings of the machine, and to focus the beam by this lens system to any desired weld area in desired focus spot size.

A further object of the invention is to provide, in the optical system, a conical lens mount in which the distance between the lens optical plane and the tip of the cone is exactly equal to the focal length of the lens. The reason for this provision is that certain microminiature parts to be welded must be held together with some pressure for good physical contact, and the tip of the cone provides this contact pressure.

A still further object of the invention is the provision of a split tip in the conical lens mount to allow escaping of any gaseous vaporized particles of dust or dirt from the weld surface.

Another object of the invention is to maintain the laser generator stationary and to provide a means for motivating the optical system to and from the workpiece mechanically or hydraulically by use of a foot pedal. For seam welding, automatic welding, and for computer-programed systems, the motivation may be provided by a variable-speed motor which by means of a cam mechanism moves the laser optical system (welding head) up and down similar to the movement of the head of a sewing machine.

A still other object of the invention is to provide a variable-temperature heating platform, or platen, on which the workpiece can be positioned and heated when necessary to a predetermined temperature prior to laser welding. A second advantage of this arrangement is that the laser-beam power can be reduced by heating the workpiece, thus prolonging the service life of the laser generator as well as the laser power supply.

During operation of the laser generator, an excessive heat is produced due to laser-stimulating intense light. This heat, if not removed, causes considerable reduction in the laser emission intensity. Therefore, a further object of my invention is to provide a continuously cooling system, and means to monitor the temperature of the laser generator and to prevent laser action until a predetermined temperature is reached in the system, whereupon the laser switch can be activated.

Other objects and advantages of the invention will become apparent from the following specification taken in conjunction with the accompanying drawing wherein like characters of reference designate corresponding parts throughout the several views of the invention, and wherein.

The principle of laser generation can be explained by a reference to simplified quantum theory which states that when atoms in a closed system are excited by an application of voltage across the system, the electrons moving in normal atomic orbits are raised to orbits or states higher than their normal states by receiving energy from the applied voltage. The electrons in the higher energy state are unstable and tend to move to a lower energy-state level. As an electron makes a transition from a higher state to a lower state, it radiates with energy equal to that moving it to the higher state. The energy with which the electron radiates is known as one photon, a quantum of light energy.

The generation of laser in general is similar to ordinary gaseous ionization and subsequent radiation. It only differs in the fact that laser photonic energy comes from photons of high-intensity visible radiation, such as from a xenon flashlamp. The photons of laser result from the radiation of electrons which have been previously raised to excited states (by xenon light), have fallen through one or more metastable states, and then radiated with energy characteristic of the radiation atom, such as the chromium ion in sapphire, known as ruby, or neodymium ion in plain glass, known as neodymium glass, either of which is used in the form of a rod as lasing (laser emitting) element.

The lasing element, or the ruby rod, as in the present invention, is exposed to an intense light of a xenon flashlamp in the laser generator head. Photons of energy $E_x$ from the xenon flashlamp excite the chromium atoms in ruby, which then radiates with a characteristic red light (6,943 angstrom wavelength) of photonic energy $E_r$ which is smaller than $E_x$, the exciting photonic energy. The ends of the ruby rod are coated with a reflective material, one end being coated more heavily than the other. Therefore, the generated photons in ruby reflect from one end surface to the other, causing oscillations of photons $E_r$. This back-and-forth oscillation of $E_r$ photons produce additional photons of $E_r$ energy, so that the radiation thus produced is monochromatic and coherent.

The oscillation of photons back and forth in the ruby rod cause an amplification of the number of photons of laser; when this stimulated radiation exceeds a certain threshold, coherent laser radiation emerges from the thinly coated end of the ruby and propagates in a pencil beam with a diameter equal to the diameter of the ruby rod. The amount of laser generated is less than 1 percent of the amount of power input to it. Roughly, for each joule (watt-second) of input energy from the power supply to the flashlamp only approximately 0.0032 joule of laser is obtained above the emission threshold, which ranges from 250 to 350 joules. For example, for an input energy of 1,300 joules, the laser energy would be $$(1{,}300-300)\times 0.0032 = 3.2$$

joules. This energy is distributed in a radiation-beam cross-sectional area equal to the area of the end face of the ruby rod, usually ¼ to ⅝ inch in diameter.

Energy of 3.2-joule magnitude spread over an area equivalent to ¼ inch diameter is ineffective for application in metalworking or welding. Therefore, the laser beam after leaving the ruby rod is transmitted through an optical lens, which converges the beam to a spot of a diameter as small as 0.001 inch or 1 mil. This increases the beam power density approximately 70,000 times that at the ¼-inch diameter area. Beam energy of this magnitude now can be used in welding, drilling, or machining metals, ceramics, glass, or even diamond, the hardest material known. The energy of this beam can be varied either by the machine electrical settings or by means of a cascade of lenses positioned with their optical axes coincident with the laser beam axis. An example of the cascaded lens system is illustrated in a sectional view in FIGURE 8, in which two biconvex beam-converging lenses are separated by a biconcave beam-diverging lens which spreads out the beam prior to incidence on the second converging lens.

Figures 1, 2, 3:
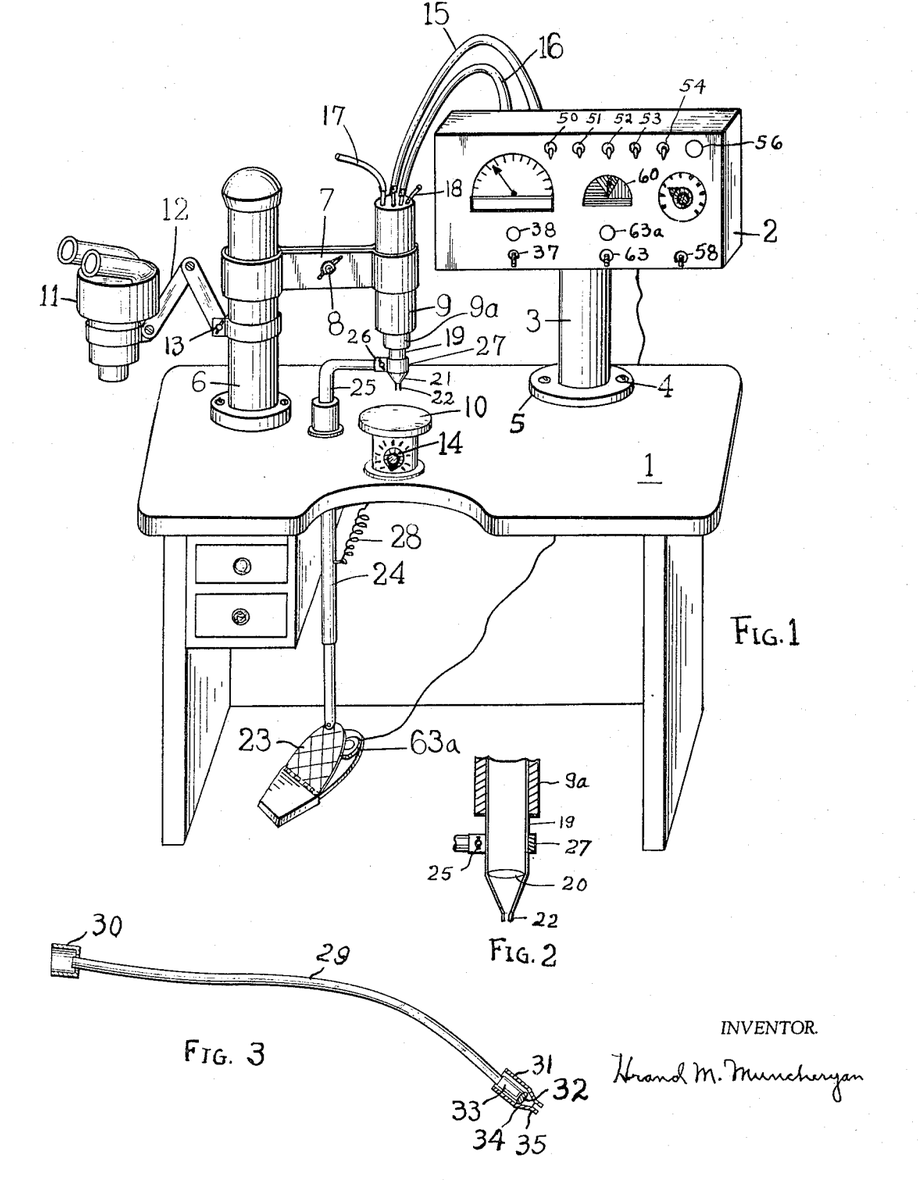
FIGURE 1 is a plan view of the laser welding machine supported on a bench for convenience of use.
FIGURE 2 is a sectional view of the laser optical system functioning as a welding head.
FIGURE 3 is a sectional view of a light pipe made of a bundle of glass fiber optics, which is attached to the laser gengerator head when parts to be welded cannot be conveniently placed on the welding bench or platen and thereby require the laser beam carried to them; the fiber optics bundle transmits the laser beam to the weld area.

Referring now to the drawing, the numeral 1 is a work bench such as a control console on which a laser power supply 2 mounted by means of a post 3 bolted at 4 and 5 to the top of bench 1. A second post 6 is attached to another side of the bench 1, laterally to said power supply, and has a holding means 7 with a wingnut 8 for adjustably mounting the laser pulse generator head 9 in desired position, with respect to the workpiece platen 10, on which the part to be welded is positioned during welding. The laser generator head includes the laser generating element, the optical system, and a cylindrical barrel enclosure thereof, to be explained more fully as the description proceeds.

On post 6, a binocular microscope 11 is also mounted by adjustable brackets 12 and wingnut 13. The microscope 11 can be swung forward and above the platen 10 for magnifying the microminiature parts of a workpiece during welding. In addition, the microscope aids in the localization of the spot to be welded while held on platen 10, which is integral with a thermostatically controlled variable-temperature heater 14 permanently attached to the bench 1 and receiving power from the 110-volt power source of the power supply 2 or from an external 110-volt power source. The heater 14 with its platen 10 is similar to a conventional temperature-controlled hot plate generally employed in an analytical chemistry laboratory. For materials of high thermal conductivity, such as gold, silver, copper, aluminum, and the like, wherein the laser heat is rapidly conducted through the material, it would be desirable to heat the material to a predetermined temperature prior to laser welding.

Figure 7:
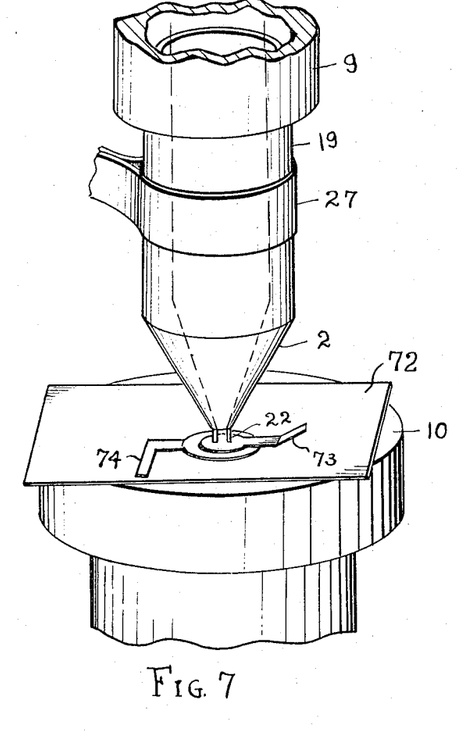
FIGURE 7 is a plan view of the lens mount illustrating the arrangement of the lens-mount cone, the split tip of the cone, and the parts to be welded.

Located at one end of the laser generator head 9 are: a power supply cable 15, a laser triggering voltage cable 16, both of which are connected to the power supply 2, and a laser cooling duct 17 which provides a stream of rapidly moving air or nitrogen into the laser generator head 9; a second duct 18 exhaust the air to the free atmosphere. A liquid coolant, such as water, liquid nitrogen, or white mineral oil, can also be used to circulate through head 9, if desired, in place of gaseous coolants. At the opposite and terminal end of the laser generator head 9 is a laser beam focusing optical system 19 consisting of a lens 20, shown in FIGURE 2, and a conical lens mount 21, which terminates at a split tip 22. The distance from the end of split tip 22 to the optical plane of the lens 20 is exactly equal to the focal length of the lens. Thus, in welding miniature parts, the split tip 22 is pressed against the parts to be welded, and the laser beam becomes incident on the area intermediate to the two points of the split tip 22, as illustrated in FIGURE 7. The split tip 22 further serves to allow the expulsion of gaseous matter, when it occurs, as a result of vaporized dust or dirt particles from the surface of the spot being welded.

The focusing optical system 19 can be moved to and from the workpiece, located on platen 10, by means of a foot pedal 23, which is integrally connected through lever 24 to the right-angled section 25 rigidly attached to said optical system 19 by means of a bolt 26 and collar 27. Thus, pressing down on the foot pedal 23 moves the optical system 19 down on the workpiece, since the optical system 19 is slidably disposed in the cylinder of head 9. This action also triggers the laser by means of switch 63a located beneath the pedal 23. Releasing the pedal 23 moves up the optical system 19; this is accomplished by means of the spring tension of spring 28 attached between the lever 24 and some convenient section under the bench 1. The spring pulls the lever 24 and thereby the right-angled section 25 upward, thus motivating the optical system 19 upward into the laser generator head 9 cylinder.

When parts to be welded are bulky or are located on structures that cannot be placed on platen 10, the optical system 19 can be detached from the laser head 9 by loosening the bolt 26, and thereby the collar 27, supporting the optical system 19. In such an event, the optical system comprising a fiber optics light pipe 29, shown in FIGURE 3, can be attached on laser head 9 by inserting the cylinder 30 into collar 27 and over reduced section 9a of laser head 9 and tightening said collar with bolt 26.

The fiber optics light pipe 29 consists of a bundle of fine glass fibers (20 to 100 micron in diameter) held together in a plastic sheath. One end of the bundle is firmly attached to cylinder 30 and the opposite end to another cylinder 31, which contains an optical system consisting of one or more lenses. The illustrative embodiment shown in FIGURE 3 contains a lens 32 and, as deemed necessary if the fiber optics bundle is greater than 1 foot long, a small ruby rod 33 may be placed posteriorly to said lens 32. The ruby rod 33 receives laser beam through the fiber optics bundle 29 and reamplifies it prior to projecting it on lens 32. The cylinder 31 has a conical section 34 terminating in a split tip 35, the over-all length of the cone 34 from the focal plane of lens 32 to the end of the split tip 35 being equal to the focal length of said lens 32. In this manner, the split tip 35 may be placed against a workpiece mounted on platen 10 or against a structure to be welded away from the machine and the laser beam will be in exact focus at the weld area.

Figures 4, 5, 6:
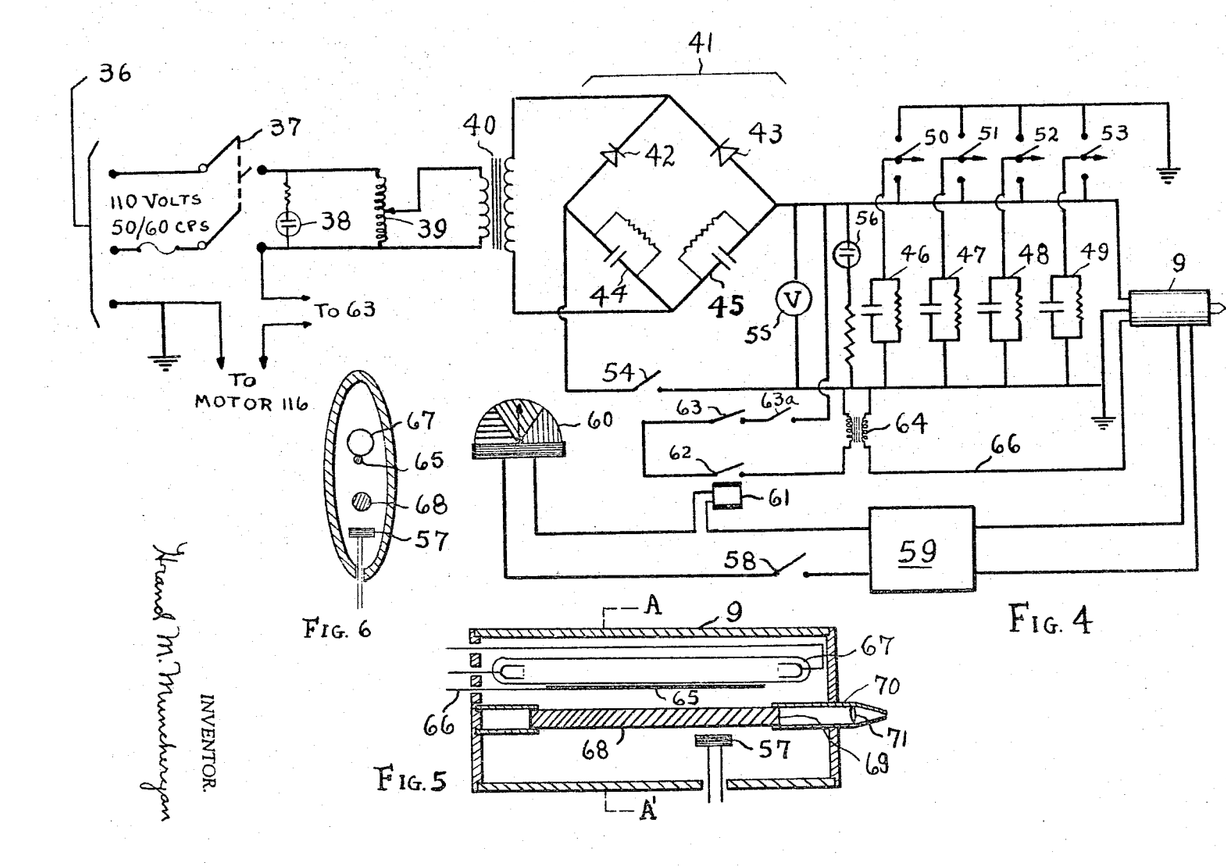
FIGURE 4 is the schematic diagram of the power supply to provide electric energy for laser action; the diagram also shows the temperature monitoring and controlling means.
FIGURE 5 is the longitudinal sectional view of the laser generator head, showing the arrangement of the laser-pumping flashlamp, the solid-state laser rod, and exemplary arrangement of the laser focusing lens, and the temperature-monitoring transducer.
FIGURE 6 is a sectional view of the laser generator head taken at A–A' shown in FIGURE 5.

The power supply 2 can be described by a reference to FIGURE 4. This power supply receives power from a 110-volt, 50/60 cycle A-C source. The power enters the system, through a 3-prong plug 36, upon closing of the main switch 37, which action energizes the following: The neon lamp 38 lights up, indicating that the power supply is turned on; the potentiometer 39 is energized and feeds voltage to the step-up transformer 40, whose secondary side applies the high voltage to the rectifying system 41, consisting of diodes 42 and 43, and the RC sections 44 and 45.

Now, any one or combination of the RC sections 46, 47, 48, and 49 can be switched into the circuit by turning on the respective switches 50, 51, 52, and 53. Subsequently, the switch 54 may be turned on, which action energizes all the switched-in RC sections and the DC voltmeter 55, which indicates the stepped-up D-C voltage value across the rectifying system 41. The potentiometer 39 can be adjusted to any desired voltage as indicated by the voltmeter 55. The neon lamp 56 also lights up, indicating that the RC sections are building up charge, which condition is also indicated by the movement of the voltmeter 55 pointer. When this pointer stops, all capacitors are charged and ready for laser action.

In order to obtain a constant laser emission for a given machine setting, the temperature of the laser generator head 9 is monitored automatically by a thermostatically-controlled thermistor 57 located in the laser head. The thermistor 57 has a built-in thermostat, such as any conventional type, that opens when there is excessive heat in the laser head, preventing any laser action to occur until the temperature therein reaches approximately room conditions. When the temperature in the laser head 9 is normal (room temperature), the thermostat in the thermistor closes, and when this condition is monitored visually by closing the switch 58, the thermally formed signal from the thermistor 57 becomes amplified by amplifier 59 and indicated on the indicator 60. The indicator 60 has three colored areas: they are blue, green, and red. For normal temperature of the laser head 9 the pointer will point to green area. For cooler temperature it will point to blue area. When excessive heat is developed in the laser head 9, the pointer will point to red area, but simultaneously the thermostat in the thermistor will open and the pointer will fall to zero position.

Upon closing the switch 58, if the laser head temperature is normal, the amplified signal will also pass through the relay 61, which closes the switch 62. The latter switch is also a safety switch so that the laser cannot be triggered accidentally or when the temperature in the laser head is abnormal. A final trigger switch 63 on the instrument panel is turned on and the foot switch 63a is pressed down to produce laser action. This latter action triggers a high-voltage pulse through transformer 64 to the triggering electrode 65 through line 66, shown in FIGURE 5, and simultaneously discharging the capacitors through the flashtube (flashlamp) 67, which lights up with a high-intensity flash. This light excites the atoms of chromium in the ruby rod 68 to emission in the characteristic spectral band of ruby, 6,943 angstroms. Because the ends of the ruby rod 68 are coated with a reflective material, one more heavily than the other, the emission oscillates back and forth axially therein and stimulates additional photons, thus amplifying the laser intensity. When the laser photonic intensity reaches a maximum, the laser beam bursts out from the thinly coated end 69, through cylinder 70, onto the lens 71, which converges the beam to a point for welding or other applications.

The laser generator head 9 may be made of aluminum, stainless steel, or any other suitable material, and may have a cylindrical or elliptical form. I have chosen the elliptical form in the embodiment shown because of the high efficiency of light reflection fom the inside walls of such a configuration on the laser rod 68. The inside surface of the laser head or housing 9, may be coated with a light reflective coating, such as silver, barium sulphate, or magnesium oxide, or any other suitable material; the reflective coating then is glazed with glass for permanent protection.

FIGURE 7 illustrates the manner of positioning a part to be welded, such as an electronic circuit board 72, with respect to the split tip 22 of the conical lens mount. An exemplary circuit terminal lead 73 is placed in a welding position over a circuit terminal pad 74, and the split tip of the laser lens mount 19 is pressed over the two pieces to be welded. When a laser burst (pulse) becomes incident on the lead 73, it will instantly melt a circular area through the two pieces and weld them together. If, for example, the circuit board substrate 72 is epoxy glass board, melting of the epoxy will be prevented by proper control of the laser thermal energy by adjustment of the machine settings, such as increasing or decreasing the voltage value and likewise the capacitance value in accordance with the equation $E = V^2 C/2$, in which V is in kilovolts, C is the capacitance in microfarads, and E is the laser input energy in joules (watt-seconds). For very thin welding materials, a finer control of the laser beam attenuation can be made by the use of the optical lens system shown in FIGURE 8.

Figures 8, 8A:
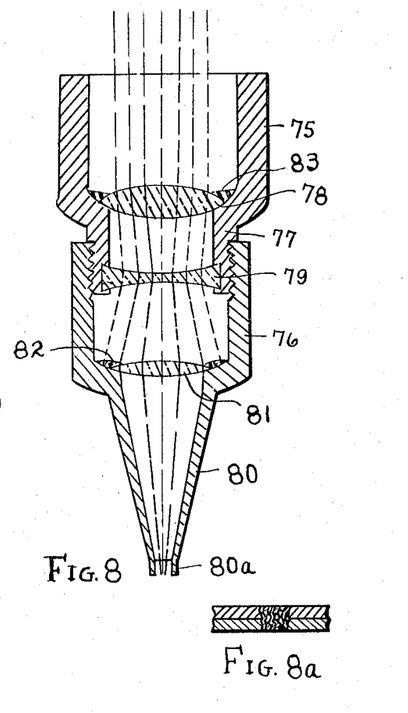
FIGURE 8 is a cross-sectional view of a conical lens mount containing a system of optical lenses cascaded for varying the intensity of the laser beam by varying the distance between the lenses.
FIGURE 8a is a cross-sectional view of a weld specimen showing the pattern of weld nugget.

In FIGURE 8, the optical lens mount comprises two cylindrical pieces 75 and 76. The cylinder 75 has a reduced section 77 wherein a biconvex lens 78 and a biconcave lens 79 are positioned at a fixed distance with respect to each other and with their optical axes in congruence. The outside of the reduced section 77 is threaded and the inside of one end of cylinder 76 is threaded in correspondence to the threaded section 77 so that they can be screwed together. The opposite end of cylinder 76 is reduced conically at 80 and inside thereof is a biconvex lens 81, held therein by a gasket 82 cemented peripherally thereto. A similar gasket 83 is cemented peripherally to lens 78 to retain it firmly in cylinder 75. The lens 81 may be made smaller than or equal in size to lens 78. The broken lines represent a beam of laser radiation; as the beam passes through the first lens 78, the beam slightly converges as it becomes incident upon the lens 79. The lens 79 diverges the beam so that only a portion of the beam reaches the second biconvex lens 81, the remaining of the beam being absorbed by the walls of the cylinder 76. With this arrangement, the cylinder 76 can be screwed closer or away from the lens 81, so that the distance between the lens 79 and lens 81 can be varied as desired. For instance, by increasing this distance the beam intensity decreases, and by shortening this distance the beam intensity increases within the limit of the beam intensity from lens 78.

The lens 81 has a longer focal length than that of lens 78, as shown by the reduced thickness of lens 81. The purpose for the longer focal length for lens 81 is to provide a relatively more parallel projection of the beam at the focus, so that the column of the spot weld will be more like a cylinder rather than conelike, following the pattern of the beam focus. FIGURE 8a illustrates the weld pattern of two sheets laser-welded together by means of a lens system shown in FIGURE 8. It will be seen that the weld nugget is not conical but is nearly cylindrical.

Figures 9, 10:
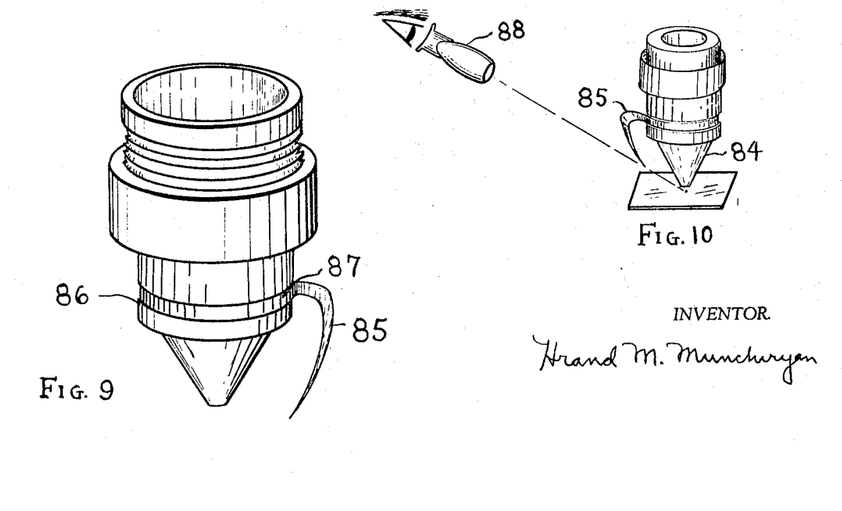
FIGURE 9 is an isometric view of an alternate embodiment of the optical lens mount, attached to which is a movable probe, peripherally rotatable, and used to localize the focus of the laser beam on the spot to be welded.
FIGURE 10 illustrates the manner of localizing the beam focus with respect to the spot to be welded by use of the embodiment shown in FIGURE 9.

FIGURE 9 represents a modified embodiment of the lens mount shown in FIGURE 7. In this embodiment, the conical part 84 does not have a split tip but is provided with a whiskerlike projection or probe 85 rotatably mounted in a groove 86 on the upper part of the cone 84. The projection 85 is made of a strip of flexible metal sheet, one end of which is formed into a collar 87 to be accommodated in groove 86 and can be manually rotated, as necessary. A focusing lens, as usual, is mounted inside the lens mount similar to that indicated by 20 in the species shown in FIGURE 7. The purpose of projection 85 is to localize the laser beam with respect to the part to be welded. The manner of localization is illustrated in FIGURE 10, in which the spot to be welded is positioned from the lens at a distance equal to the focal length of the lens, by measuring with a ruler with fine scale thereon, and the point of the projection 85 is sighted with the microscope 88 upon the spot precisely by bending the point to direct it to the spot to be welded. After this first adjustment, all other spots to be welded are aligned under the cone with respect to the point of the projection 85. When thus aligned, the laser beam will strike the exact spot selected. When using this scheme, the end of the cone 85 does not touch the workpiece, and therefore the parts to be welded are pressed together by means of the points of a pair of tweezers.

Figures 11, 12:
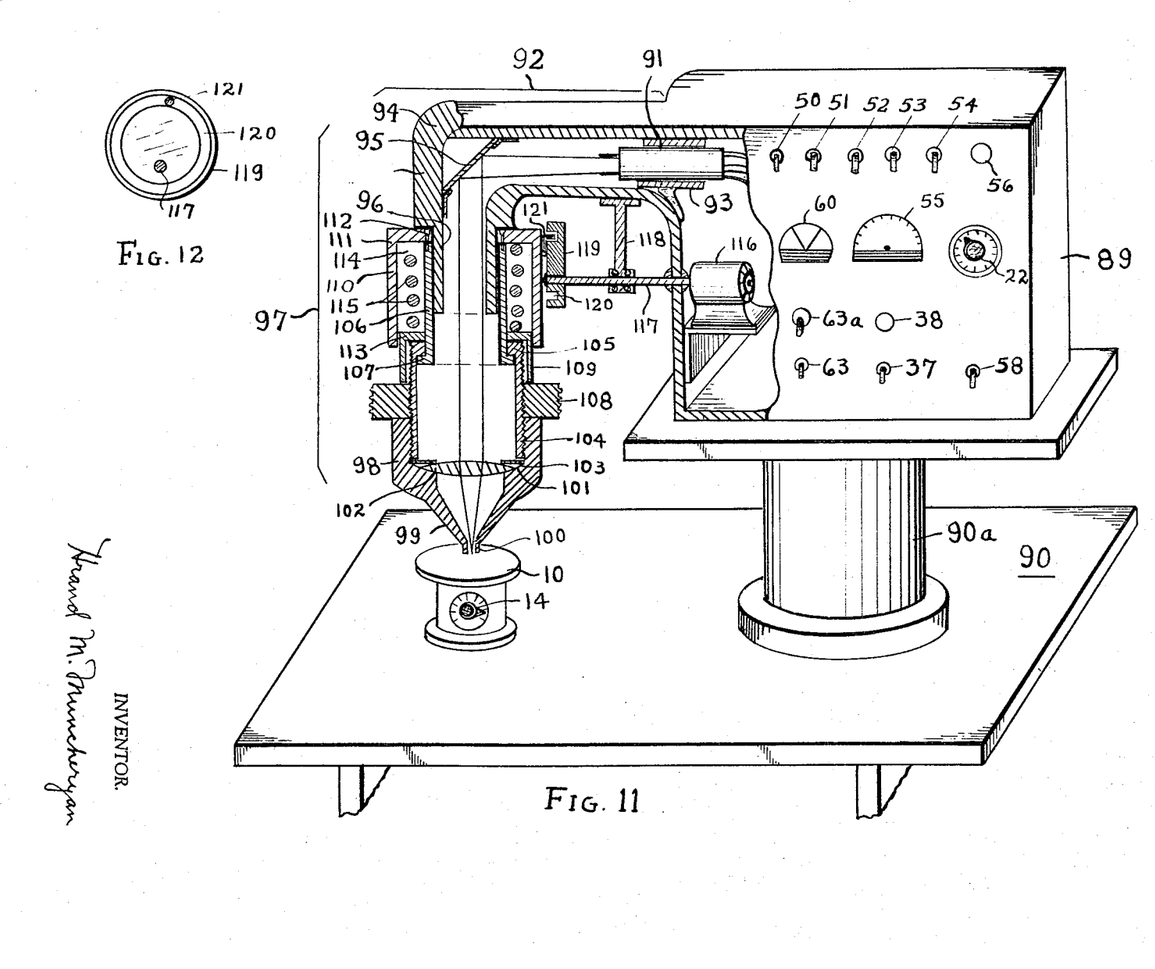
FIGURE 11 is an alternate motorized embodiment of the laser welder, partially sectioned to show the relationship of the optical parts with respect to the laser beam.
FIGURE 12 is an isolated view of the cam mechanism that motivates the optical lens system to and from the workpiece positioned on the platen.

A modified embodiment of the laser welder is shown in FIGURE 11, in which a laser power supply 89 is supported on a bench or control console top 90 by means of the column 90a permanently attached to said bench top. The legs of the bench are shown as sectioned to provide more illustrative area in the figure. The electronic circuit of this laser supply power is similar to that shown in the schematic diagram of FIGURE 4. Integral with power supply 89 and extending laterally therefrom is a pulsatory laser generator 91 positioned fixedly in a cylindrical laser generator head 92 by bracket 93. The cylinder including the laser generator head 92 is provided with a 90-degree bend at its forward end 94 and a reflective plate 95 is positioned angularly at said bend so that it bends the laser beam 90 degrees with respect to its propagation axis from the laser generator 91. The plate 95 may be made of metal with highly polished surface or it may be a mirrored surface. The terminal end of said cylinder 92 is adapted (reduced) peripherally as at cylindrical section 96 to accommodate an optical system 97 slidably inserted over said section 96 and held thereon for free up-and-down movement by a means to be described hereinafter.

The optical system 97 comprises a lens mount 98 having one end screw-threaded internally and the other end being conical, as at 99, and terminating at a split-tip end 100. The base of the threaded section of lens mount 98 is adapted with a shoulder 101 to accommodate a lens 102 held therein by means of a gasket 103. The distance between the optical plane of lens 102 and the end of split tip 100 is equal to the focal length of the lens. When it is desired to vary the focal length of the lens, the lens mount 98 is removed by unscrewing it from the threaded cylinder 104 and replacing it by another lens mount of different focal-length lens. The upper section of cylinder 104 is provided with a flange 105 projecting inwardly therefrom. A second cylinder 106 having an outwardly projecting flange 107 is disposed in said optical system 97, with the flange 107 in contact with the inwardly projecting flange 105 of cylinder 104.

An internally threaded adjustment annulus 108 is screwed over cylinder 104 and is movable thereon by rotating the annulus 108. An internally flanged collar 109 is loosely disposed on said annulus 108 surrounding the flange 105 of cylinder 104. A sleeve 110, having an internal flange 111 is disposed over cylinder 106, with said flange 111 seated over said cylinder and attached thereto by screws 112. The lower end of said sleeve 110 partially covers the internally flanged portion 113 of collar 109 and is slidable thereupon. The cylinder 106 and sleeve 110, together with the flanged portion 113, form a cylindrical chamber 114, and a coil spring 115 is disposed in said chamber. The purpose of the spring 115 is to retain the lens mount 98 at a predetermined tension by means of the adjustment annulus 108, thus, rotating the annulus 108 to move it up increases the tension, and rotating it in the opposite direction decreases the tension on the lens mount 98. The purpose of the tension on the lens mount 98 is for the latter to exert a predetermined, constant pressure upon the parts being welded, as explained previously. The entire assembly of optical system 97 is mounted over the reduced section 96, for slidable movement thereon.

Located inside the power supply 2 cabinet is a variable-speed motor 116, having a shaft 117 extending therefrom to the exterior of the cabinet. The shaft 117 is externally supported by a bracket 118 having, at its terminal end, rings with ball bearings with said shaft passing therethrough and terminating at a disklike cam 119. The cam 119 has a circular groove 120 on one surface, more precisely illustrated in FIGURE 12. A detent-type projection 121 integral with sleeve 110 is accommodated in groove 120. The shaft 117 is rigidly attached to cam 119 at an off-center position, so that when the shaft 117 rotates by means of motor 116, the cam is rotated in an off-center orbit, causing the projection 121 to move down and up with each rotation. Since the projection 121 is integral with sleeve 110, which in turn is connected with the other elements of the optical system 97, the entire assembly of the optical system moves down and up for each rotation of the shaft 117. This arrangement produces an up-and-down movement of the laser optical system 97 in the same manner as head of an electric sewing machine. The controls and instruments shown on the panel of power supply 89 are identical with those shown on power supply 2, with the exception that the second trigger switch 63a is located on the panel instead of on a foot pedal, as in 23. The switch 63a is actuated manually, or automatically, in which latter event, the cam 119 causes the split tip 100 to make a contact with the workpiece positioned upon platen 10 for welding. In the automatic mode of operation, a second cam may be mounted on shaft 117 so that when cam 119 moves the optical system 97 completely down on the workpiece, the second cam closes the switch 63a which would be attached by a contacting means to bracket 118 and be in contactable relation to the second cam.

I have thus provided a novel and useful method and equipment for welding microminiaturized circuit components as well as large structural parts of aircraft, assemblies, units, vehicles, and equipment, in a manner easily manipulative and effectively accomplished. Moreover, while I have signified the use of this laser equipment for welding, drilling, and machining metal, glass, ceramic, and the like, I reserve the right to employ the device and its concept for other applications such as drilling holes in human teeth by use of the fiber optics embodiment shown in FIGURE 3 herein, and certain types of medical use such as removing warts from skin, cauterizing superficial growths or infected glands, and the like. Therefore, it is understood that various changes may be made in the invention to achieve these functions without departing from the spirit and scope thereof.

I claim:

1. A laser welding machine, comprising a bench, an electric power supply supported on said bench, a post secured to the top of said bench in the lateral aspect of said power supply, a laser generator head adjustably secured on said post and supplied with power from said power supply for generation of a laser beam, electric control means in said power supply to regulate the power to said laser generator head and thereby to vary the intensity of said laser beam, and an optical system positioned in said laser generator head and having a split-tip conical terminal section; treadle means connected through said bench top to said conical terminal section and having actuating means adapted to move said conical terminal section up and down within said laser generator head, and a laser triggering means connected in the circuit of said laser generator head being further connected to and being cooperative with said treadle means to trigger said laser generator head to emission of a laser beam upon depression of said treadle; heatable means disposed on the top of said bench for holding a workpiece in the inferior relation of said conical terminal section, and a binocular microscope attached to said first-mentioned post in swivelling respect thereto for viewing the area of the workpiece to be welded under said conical terminal section.

2. A laser welding machine, comprising a bench, an electric power supply supported on said bench, a laser beam generator head disposed in the lateral relation to said power supply to receive therefrom power for activation of the laser beam generator in said generator head, a control means in said power supply to regulate the power thereof for varying the intensity of radiation from said laser generator, an optical system comprising a lens mount having one end cylindrical and the opposite end conical and provided with an array of biconvex lenses and a biconcave lens therebetween, with their optical planes normal to the laser beam projecting from said generator head, said cylindrical end of said lens mount being adapted on its interior periphery to be slidably accommodated on said laser generator head, said cylindrical and conical ends having therebetween means adapted for displacement of said ends one from the other for adjusting said laser beam upon a workpiece placed under said conical end during welding said workpiece.

3. A laser welding machine as defined in claim 2, wherein said lens mount is provided with two peripherally mated cylindrical sections adjustably held together by screw-thread means therebetween, one of said cylindrical sections being provided axially thereof with a biconvex lens and a biconcave lens spaced therefrom, and the second of the two sections being provided with a split-tip cone having at its base section a biconvex lens disposed opposite to said biconcave lens and spaced from the split tip of said cone a distance equal to the focal length of said biconvex lens in the base of said cone, said second section being movable to and from said first section by rotation thereof at said screw-thread means to change the optical spacing therebetween, thereby altering the magnitude of the wavefront of the cone of laser beam diverging from said biconcave lens prior to incidence upon said biconvex lens in the base of said cone.

4. A laser welding machine, comprising a bench for laser welding operation, a laser power supply supported on one side of said bench; a laser pulse generator head containing a flashlamp, a laser-generating source element, a temperature sensor to monitor the temperature of said laser generator head, and an optical system projecting from said head, being disposed laterally to said power supply on said bench and receiving electric energy from said power supply to energize said flashlamp and thereby to stimulate said laser-generating element to emit radiation; a laser-triggering means provided in the circuit of said power supply and connected to said flashlamp; means connected in the circuit of said temperature sensor to amplify the signal from said sensor and a second means in said circuit associated with said laser-triggering means to control the triggering action thereof; said optical lens system having a cylindrical section slidably accommodating thereon a cylindrical split-tip lens mount with means adapted to move said lens mount reciprocatively with respect to said cylindrical section; and, actuating means electrically connected to said laser-triggering means and mechanically connected to said means on said lens mount for movement thereof to and from said cylindrical section on said optical lens system; said means on said lens mount being further adapted to actuate said laser-triggering means upon movement of said lens mount away from said cylindrical section of said optical lens system.

5. A laser welding machine, comprising a laser-beam generator, and an electric power supply to activate said laser-beam generator to emission of radiation, said power supply having therein an electric control means to regulate the energy activating said laser-beam generator, reflective means in said laser generator disposed angularly in axial aspect thereof and said laser beam to divert the propagation of said laser beam from said laser generator, and an optical means disposed in the axial path of said diverted radiation to alter the beam density thereof to project it to a predetermined focus dependent on the focal length of said optical means, and a mechanical means in said optical means having an axial dimension equal to said focal length, to transmit said radiation beam to the exterior of said optical means and to confine the magnitude of said focus length of the projected beam to the axial length of said mechanical means.

6. A laser welding machine, comprising a laser work bench, a laser power supply supported on said bench and a cylindrical laser generator head projecting from one end of said power supply and receiving electric power therefrom for generation of laser radiation, said cylindrical laser generator head being provided in the axial relation thereof with a 90-degree bend and an optical system having a conical section located in the terminal end thereof, a reflecting means positioned in said bend in the path of said laser radiation to direct said radiation to said optical system, said conical section having a lens means and being adapted with split tips at its apex extending from said lens means to a distance equal to the focal length of said lens means in said optical system.

7. In a laser welding machine comprising an electric power supply and a laser generator receiving power from said power supply for generation of a laser beam, said laser generator having a cylindrical section and a laser generating element disposed therein, said cylindrical section being provided with an optical mount made of two sections being telescopic on each other by a threaded attachment therebetween and a system of lenses mounted in said optical amount with their optical planes in axial relation thereto and to said laser beam to attenuate said laser beam from said laser generating element, and a conical extension on said optical mount having a split tip at its apex located at a distance equal to the focal length of the lens nearest to said split tip.

8. A laser welding machine, comprising a bench, a laser power supply supported on said bench and a cylindrical laser generator head projecting from one end of said power supply and receiving electric power therefrom for generation of laser radiation, said cylindrical laser generator head being provided with a 90-degree bend at its forward end and a reflective plate therein placed at an angular relation thereto to divert said laser radiation at right angles to its propagation from said generator head, the terminal portion of said generator head forward to said bend being reduced peripherally and an optical system slidably accommodated over said reduced section for up-and-down movement thereon, an electric motor disposed in said power supply and having a shaft extending to said optical system and engaged thereon by means of a cam mechanism on said shaft for reciprocative movement of said optical system with rotation of said cam mechanism by said motor, said optical system having a lens mount with one end screw threaded internally and the other end conical and terminating at a split-tip end, the base of said screw threaded section having a lens disposed perpendicularly to the axial aspect thereof and with its optical plane positioned at a distance from said split-tip end equal to its focal length.

9. A laser welding machine, comprising a bench for welding operations, a laser power supply having a variable-speed motor therein supported on said bench, said motor having a shaft with a cam means, a laser generator head having an optical system in forward relation thereof projecting integrally from one end of said power supply and receiving energizing power therefrom, said optical system being mechanically connected to said cam means and adapted to be motivated thereby, and a temperature-controlled platen affixed on said bench in inferior relation to said optical system for holding and heating a workpiece in welding position with respect to said optical system motivated with reciprocative movement with reference to said platen.

10. A laser welding machine, comprising a work bench, a laser power supply supported on said bench, a laser generator head mounted on a post supported on said bench laterally to said power supply and receiving laser generating power therefrom, a temperature-controlled platen attached to said bench in adjacent relation to said laser head to hold a workpiece in welding relation thereto, and a binocular microscope mounted on said post in swivelling relation thereto serving to magnify microminiature workpiece being welded on said platen, said laser generator head having a movable lens mount at its terminal end and with a lens therein; said lens mount having means adapted to slide within said generator head to and from said platen, and a treadle attached to said lens mount for movement thereof.

11. A laser welding machine, comprising a work bench, a laser power supply supported on said bench, a laser generator head positioned laterally thereto and receiving laser stimulating energy therefrom, and a temperature-controlled platen attached to said bench on the top thereof in inferior relation to said laser head for holding and heating parts in welding position thereon and in the path of laser radiation issuing from said laser head, said laser head having a cylindrical section with its terminal portion reduced peripherally, a fiber optics light pipe having a cylindrical means at one end adapted to be secured to said cylindrical section and at the other end being provided with a split-tip conical lens housing with a lens disposed therein and a laser generating means positioned between said lens and the terminal end of said light pipe to transmit said laser radiation from said fiber optics through said laser generator means to said lens therein to focus said radiation on the part to be welded held on said temperature-controlled platen and at a distance equal to the focal length of said lens.

12. A laser welding machine as described in claim 11, wherein said split-tip conical lens housing receiving one end of said fiber optics being provided with a plurality of variably spaced lenses.

13. A laser welding machine, comprising a work bench, a laser power supply supported on one side of said bench, a laser generator disposed laterally to said power supply and receiving laser-stimulating electric energy therefrom, and a temperature-controlled platen positioned adjacent to said laser generator head to hold a workpiece in welding position, said laser generator head having an optical system with a conical lens mount provided with a lens therein and a split tip at its apex distanced at focal length of said lens, and means in said laser welding machine connected to said conical lens mount to motivate said split tip thereof to and from said temperature-controlled platen.

14. A laser welding machine as described in claim 8, wherein said optical system containing a lens mount being provided with a resilient means exerting a constant adjustable pressure upon said lens mount, and a second means to adjust the tension on said resilient means, thereby changing the pressure exerted by said resilient means upon said lens mount, said lens mount being in contact with the workpiece during welding and transmitting said pressure thereupon.

15. A laser welding machine, comprising a control console, an electric power supply secured to the top of said console, a laser generator with a cylindrical optical means slidably adapted thereon being positioned adjacently to said power supply and receiving electric power therefrom for emission of laser radiation, a vertical post secured to one side of said console top and a binocular microscope mounted thereon with brackets permitting swivelling movement thereof to and from said optical means, and a heatable platen means for mounting a workpiece thereon being secured to said console top in the inferior relation to said optical means; said power supply having incorporated in the circuit thereof a power control means and a laser triggering means which having in the circuit thereof a thermosensing element located in said laser generator to monitor its temperature on which said laser triggering means being dependent for its laser triggering operation;

said optical means being movable upon and down with relation to said heatable platen and having at the terminal end thereof a conical lens mount provided with a lens at its base section and a split tip at its apex which being located at a distance from said lens equal to the focal length thereof; a motive means mechanically connected to said laser triggering means for activating said triggering means upon movement of said optical means to said workpiece mounted on said heatable platen.

16. A laser welding machine, comprising a control console, an electric power supply secured to said console on the top thereof, a laser generator having a cylindrical optical means with a conical section with split tip at the terminal end thereof being positioned adjacent to said power supply and receiving electric power therefrom, a vertical post secured to the top of said console in adjacent relation to said laser generator and provided with a binocular microscope with means to permit swivelling movement thereof to and from said laser generator, means incorporated in said power supply to furnish incremental electric power to said laser generator, and laser triggering means connected in the circuit of said power supply and having a thermosensing element located in said laser generator to monitor the temperature thereof and thereby to permit said laser triggering means to trigger said laser generator; said laser triggering means being adapted for up-and-down movement with respect to said console top and to close the triggering circuit upon downward movement thereof being secured to said optical means for movement thereof to and from a workpiece positioned on said console and simultaneously to trigger the laser power from said power supply upon downward movement of said optical means and hence the split tip of said conical section thereof to contact said workpiece.

17. A laser welding machine, comprising a control console, a power supply secured to the top thereof, a laser generating housing integrally formed on said power supply and projecting horizontally therefrom, a laser generator with means to activate said generator to emission of laser radiation being disposed in said housing, which having an elongated cylindrical section with a 90-degree bend at its middle portion and a reduced section at the terminal end thereof, an optical system with means secured on said reduced section and adapted for reciprocative movement of said optical system on said reduced section, said optical system having a lens mount provided with a conical section having a lens at its base and a split tip at its apex which being disposed from said lens at a distance equal to the focal length of said lens; a radiation reflector positioned in said bend of the cylindrical section to receive laser radiation from said generator and to reflect said radiation to said lens for transmission through said conical section; heatable means for holding a workpiece in welding position secured to the top of said console adjacent to said split tip of said optical system; and, means having a reciprocatively movable section and being incorporated in said power supply and energized thereby being connected at its moveable section to said optical system for movement thereof to said workpiece in welding.

18. In a laser welding machine, a laser generator head and a power supply contained in said machine for energizing said laser generator; said laser generator having in the forward end thereof a cylindrical section with a reduced terminal portion, a fiber optics light pipe having at one end thereof a cylindrical collar adapted to be secured to the reduced terminal portion of said cylindrical section and at its opposite end being provided with an optical system with a housing terminating in a conical lens mount with split tip at its apex; a chamber formed in said housing; a lens disposed at the base section of said conical lens mount and a laser amplifying means positioned in said chamber between said lens and the terminal portion of said light pipe; said split tip being disposed from said lens at a distance equal to the focal length of said lens.

References Cited
UNITED STATES PATENTS

| | | | |
|---|---|---|---|
| 3,281,712 | 10/1966 | Koester | 219—121 |
| 3,297,876 | 1/1967 | De Maria | 219—121 |
| 1,860,575 | 5/1932 | Gehrke. | |
| 2,699,700 | 1/1955 | Klemt. | |
| 3,096,767 | 7/1963 | Gresser et al. | |
| 3,265,855 | 8/1966 | Norton | 219—121 |

RICHARD M. WOOD, *Primary Examiner.*

J. V. TRUHE, *Examiner.*

W. D. BROOKS, *Assistant Examiner.*